Feb. 24, 1942.  W. A. MULHERN  2,274,496
WHEEL RIM DECORATIVE RING
Filed June 19, 1940
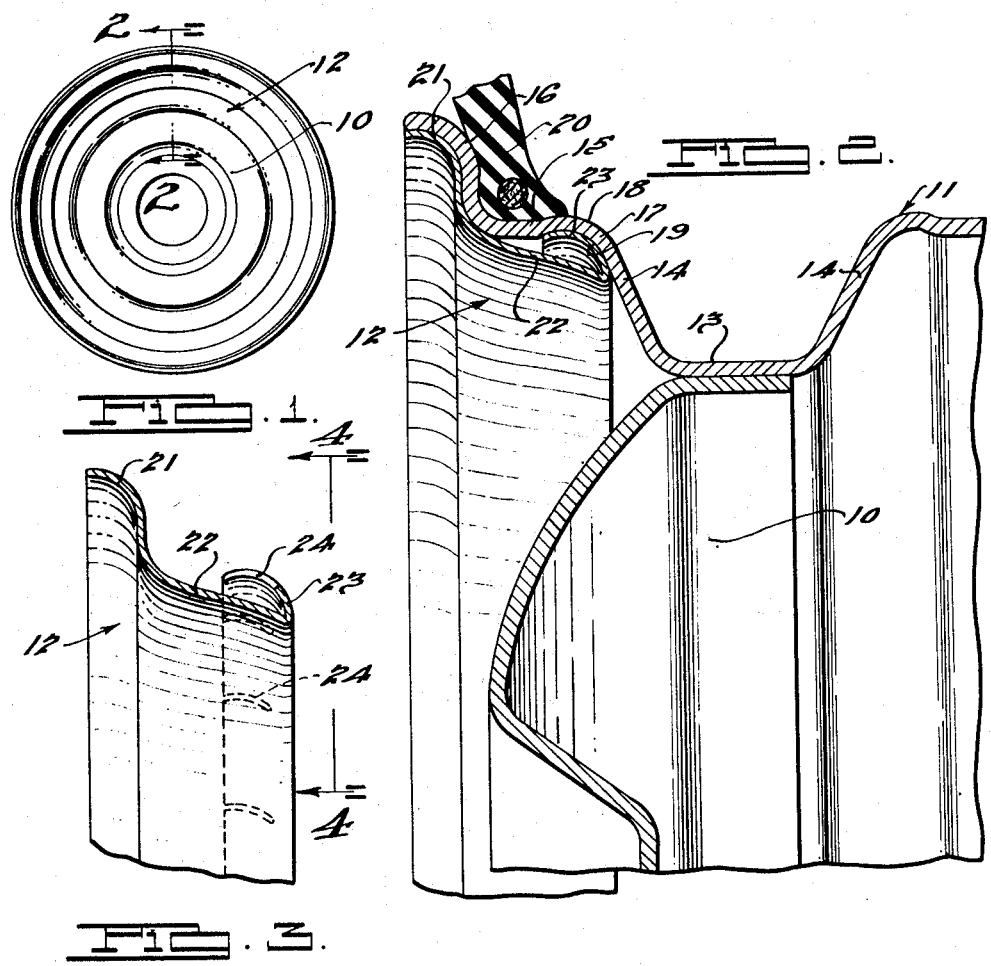
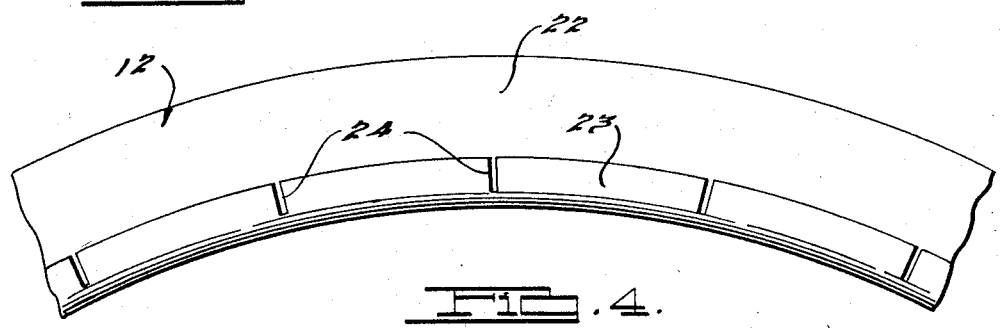
INVENTOR
William A. Mulhern.
BY
Harness, Dind, Pate & Harris
ATTORNEYS.

Patented Feb. 24, 1942

2,274,496

UNITED STATES PATENT OFFICE 2,274,496

WHEEL RIM DECORATIVE RING

William A. Mulhern, Detroit, Mich., assignor to Chrysler Corporation, Highland Park, Mich., a corporation of Delaware Application June 19, 1940, Serial No. 341,255

8 Claims. (Cl. 41—10)

This invention relates to an improved tire rim and ornamental band assembly.

More particularly, the invention pertains to an improved ornamental band that is particularly adapted for detachable attachment to a drop center tire rim of the type which has a circumferentially extending hump disposed inwardly of that portion of the rim, which lies adjacent the inner edge of the peripheries of a tire bead, for preventing unintended displacement of the tire bead and the adjacent tire wall into the drop center portion of the rim when the tire is deflated.

One of the main objects of the invention is the provision of an ornamental band of this character which is detachably securable to a drop center hump tire rim without requiring for its reception and attachment the provision of any variation in the rim structure in addition to that inherently present in hump tire rims of this kind.

Another object of the invention is the provision in an ornamental wheel band of attachment means by which can be taken advantage of the reversely bent hump part of a drop center rim for the purpose of firmly anchoring the band to the rim.

A further object of the invention is the provision of attachment elements on the band of this kind which have yieldably urged surfaces of substantial area resiliently pressed against registering and conforming surface portions of a wheel rim and which are free from edgewise scraping, digging or gouging contact with the rim.

An illustrating embodiment of the invention is shown in the accompanying drawing, in which:

Fig. 1 is a side elevational view of a tire rim having an ornamental band embodying the invention.

Fig. 2 is an enlarged fragmentary sectional view taken on the line 2—2 of Fig. 1.

Fig. 3 is a fragmentary perspective view, partly in section, of the ornamental band shown in Figs. 1 and 2.

Fig. 4 is a fragmentary side elevational view of the band shown in Figs. 1, 2 and 3 illustrating the band as it appears in the line 4—4 of Fig. 3.

In Figs. 1 and 2 of the drawing is illustrated a wheel 10 having a hump drop center rim generally designated by the numeral 11 on which is adapted to be mounted an ornamental band 12 embodying the invention. The rim 11 comprises a drop center channel portion 13 having outwardly inclined side walls 14, a stepped portion 15 and an outer curved marginal part 16.

Formed at the junction of the inclined channel wall 14 and the stepped portion 15 is a circumferentially extending hump 17 which is bodily displaced outwardly so as to present a convexed outer surface 18 on the tire receiving side of the rim and a concaved surface 19 on the opposite side thereof. The circumferentially extending hump 17 serves to prevent unintended inward movement of a tire bead 20 and the adjacent tire wall portion into the channel 13 of the rim. Thus, when the tire is deflated during driving of the vehicle, tendency for the tire casing to leave the wheel is prevented.

The ornamental band 12 preferably comprises chromium plated or otherwise ornamented sheet metal having substantial resiliency. This band has an outer body portion 21 which conforms in curvature closely with the curvature of the marginal portion 16 and the curved junction of the latter with the step 15 of the rim. The inner or complementary body portion 22 of the band 12 extends in diverging relationship with respect to the stepped portion 15 of the rim and terminates adjacent the inclined side wall 14 of the channel 13. Formed on the inner extremity of the diverging portion 22 of the band is a reversely bent marginal flange 23 having an arcuate cross section conforming and registering with the concaved side 19 of the hump 18. The flange 23 has an extended surface contact with the under side of the tire rim against which it is yieldably pressed by virtue of the resilience of the sheet metal from which the band is formed and by reason of its construction. A plurality of circumferentially spaced slots 24 are formed in the marginal portion 23 to produce yieldable tongues therebetween.

The improved ornamental tire rim band may be conveniently mounted on a tire rim of the hump type by merely pressing it upon the under side of the rim. The resilient expansive action of the flange 23 firmly holds the band against unintended removal but accommodates convenient removal of the band when desired by the insertion of a screw driver or other suitable tool between the reversely bent flange 23 and the concaved surface 19 of the hump 17. Bands embodying the invention may thus be applied to hump tire rims without making special provision in the rim construction either for reception of the band or for locking it in place. Digging or gouging of the edge portions of the ornamental band into the metal of the tire rim in order to secure it against removal is avoided for all attaching forces are applied throughout extended surface areas.

Although but one specific embodiment of the invention is herein shown and described, it is to be understood that various modifications in the size, shape and arrangement of parts may be made without departing from the spirit of the invention.

I claim:

1. An ornamental sheet metal band adapted to be disposed adjacent the under surface of an inclined stepped wall of a tire rim having a bodily outwardly circumferentially extending hump adjacent the inner extremity of the stepped portion thereof including a body part having an outer marginal portion conforming to the cross sectional contour of the outer marginal part of said rim and the junction of the latter with said stepped portion and having an inner body part diverging from the portions of said rim with which it registers, and resilient retaining elements on the inner marginal portions of said band extending inwardly between said diverging body part of said band and the portion of said rim in which said hump is formed, said retaining elements having arcuately formed extended side surface portions resiliently conforming with and resiliently bearing against the major portion of the area of the concaved side of said hump.

2. An ornamental sheet metal band adapted to be disposed adjacent a generally inclined stepped side wall of a tire rim which has a circumferentially extending hump provided with concaved inner and convexed outer sides including a body part having an outer portion conforming in contour with and adapted to lie adjacent the under surface of the outer portions of said side wall and an inner portion formed to diverge from the intermediate portion of said wall, and retaining members integrally formed on the inner edge portions of said body part and reversely bent into the space between said inner diverging portion of said band and the concaved side of the hump portion of said rim, each of said retaining members having an extended surface conforming to the curvature of the concaved side of said hump portion and adapted to be yieldably urged against the latter and to retain the edge of the free extremity of said member from contact with said rim.

3. An ornamental sheet metal band adapted to be disposed adjacent the inner side of a vehicle tire rim having a drop center channel and a stepped side wall having a circumferentially extending outwardly convexed and inwardly concaved hump including a part conforming in cross section to registering portions of the under side of said rim and adapted to contact the latter, and reversely bent tongues on said band having curved side surface portions adapted to fit in the concaved sides of said hump for detachably holding said band on said rim.

4. An ornamental tire rim band comprising an outer body portion conforming in cross section to the portion of a tire rim with which it registers and adapted for extended surface contact therewith, an inner body portion so constructed and arranged as to extend in diverging relationship with respect to the portion of said rim with which it registers, and an integral reversely bent marginal flange on said inner body portion having an arcuate cross section and provided with an arcuate side surface portion adapted for extended surface contact with a correspondingly shaped portion of said rim.

5. An ornamental sheet metal tire rim band comprising an outer body portion conforming in cross section to the portion of a tire rim with which it registers and adapted for extended surface contact therewith, an inner body portion so constructed and arranged as to extend in diverging relationship with respect to the portion of said rim with which it registers, and an integral reversely bent resilient marginal flange on said inner body portion extending over a part of the latter and having a plurality of circumferentially arranged tongues of arcuate cross section each provided with an arcuate side surface portion adapted for resiliently urged extended surface contact with a correspondingly shaped portion of said rim and having an edge on its free extremity normally held by said arcuate side surface portion from contacting engagement with said rim.

6. An ornamental sheet metal band adapted to be detachably mounted on a generally stepped side wall of a tire rim which has a circumferentially extending hump provided with convexed inner and concaved outer sides comprising a generally frusto-conical body part for shrouding the external side of said tire rim and having outer edge portions on said body part engageable with corresponding portions on said rim, and a plurality of resilient snap acting retaining members circumferentially arranged with respect to said body part each having a curved deflectable free end portion adapted to engage the concaved side of said hump for detachably holding said band on said rim.

7. An ornamental sheet metal band adapted to be detachably mounted on a generally stepped side wall of a tire rim which has a circumferentially extending hump provided with convexed inner and concaved outer sides comprising a generally frusto-conical body part for shrouding the external side of said tire rim and having outer edge portions on said body part engageable with corresponding portions on said rim and a plurality of resilient snap acting retaining members circumferentially arranged about said band and extending from the inner edge portions thereof toward the outer edge of said band, said members being adapted to be disposed between the body portion of said band and said rim and having free curved deflectable end portions adapted to engage the concaved side of said hump for detachably holding said band on said rim.

8. An ornamental sheet metal band adapted to be disposed adjacent the inner side of a vehicle tire rim having a drop center channel and a stepped side wall having a circumferentially extending outwardly convexed and inwardly concaved hump including an outer part adapted to seat against an outer portion of said rim, and tongues on said band having curved side surface portions adapted to fit in the concaved side of said hump for detachably holding said band on said rim.

WILLIAM A. MULHERN.